Figure 1:
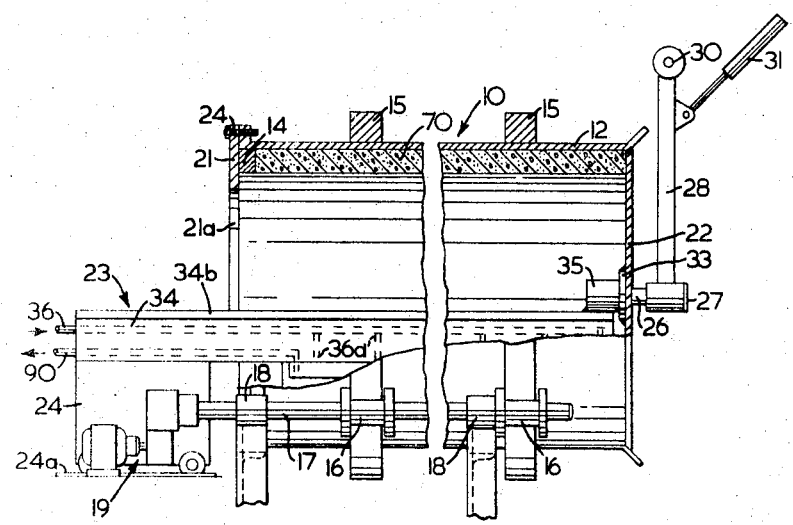

United States Patent [19]
Barratt

[11] 3,773,447
[45] Nov. 20, 1973

[54] APPARATUS FOR PRODUCING CEMENT SHEETS

[76] Inventor: William C. Barratt, 595 Sheppard St., Niagara Falls, Ontario, Canada

[22] Filed: Jan. 3, 1973

[21] Appl. No.: 320,770

Related U.S. Application Data

[63] Continuation-in-part of Ser. No. 166,779, July 28, 1971, abandoned.

[30] Foreign Application Priority Data

Feb. 1, 1972 Great Britain................4712/72

[52] U.S. Cl...................... 425/86, 264/86, 425/297, 425/435, 425/436
[51] Int. Cl............................................ B28b 21/08
[58] Field of Search..................... 425/86, 182, 297, 425/308, 324, 425, 426, 427, 436, 435, DIG. 44, DIG. 124; 249/112; 264/86, 159, 311

[56] References Cited
UNITED STATES PATENTS

| | | | |
|---|---|---|---|
| 1,786,586 | 12/1930 | Walter | 264/86 |
| 2,497,160 | 2/1950 | Fejmert | 425/426 |
| 2,993,235 | 7/1961 | Brown et al. | 264/311 |
| 3,635,281 | 1/1972 | Comte et al. | 425/436 |

Primary Examiner—H. A. Kilby, Jr.
Attorney—John W. Malley et al.

[57] ABSTRACT

Apparatus for producing a cement sheet, including a rotatable mould into which a cement mix is fed to form a soft, centrifugally moulded cylinder, which is then removed from the mould, divided longitudinally, and laid out flat to harden. The soft cement cylinder is removed by means of a mandrel inserted into the cylinder while in the mould. During removal from the mould, the cement cylinder is held onto the mandrel either by vacuum applied to perforations in the wall of the mandrel, or by means of a liner initially placed within the mould and which surrounds the cylinder while it is removed from the mould on the mandrel. Slitting means are provided, movable relative to the mandrel to form a longitudinal slit in the soft cylinder on the mandrel after its removal from the mould. The apparatus is particularly useful for producing small quantities of asbestos cement sheets with special laminations or surface effects. Apparatus in accordance with the invention may be used for producing sheets of flowable hardenable material other than cement.

21 Claims, 22 Drawing Figures

APPARATUS FOR PRODUCING CEMENT SHEETS

This application is a continuation-in-part of my United States Patent application Ser. No. 166,779, filed July 28th 1971 now abandoned.

The present invention relates to apparatus for producing sheets from a flowable hardenable material such as cement, which sheets may be flat, curved or contoured. The invention particularly relates to apparatus for performing the process of copending Patent application Ser. No. 166,778 also filed July 28th 1971. The sheets may be used either as produced or cut to smaller sizes, for example as structural members, wall panels, or roof sections, or for decorative components such as tiles, moulds, millwork or shingles.

In the known wet process for manufacturing cement sheets, and particularly asbestos cement sheets, a large plant is required which in order to be economical must operate on a high production basis, and such a process is not easily adapted for producing small quantities of special decorative materials.

The present invention provides apparatus which is suited to the economical production of small quantities of cement sheets, and which can readily be adapted to produce a wide variety of surface finishes, or other characteristics, in the cement sheets produced. The apparatus produces the cement sheets singly, one after the other, and it is a very simple matter to modify the operation of the apparatus between individual sheets, so that a wide variety of different cement sheets can be produced in a short time. The cement sheets can vary as to thickness, composition, colour, and the nature and shape of the surface finish. The apparatus thus is very suitable for producing a lot of different components, having different shapes and surface finishes, for a single building. The apparatus used in accordance with the invention does not require a large investment or take up a large amount of space, so that it is very suitable for location in the locality where building is taking place. Furthermore, the nature of the process used gives a high strength product due to avoidance of excess water, uniformity of wall thickness, high density and predetermined directional resistance to stresses. In the case of cement reinforced by fibres, such as asbestos cement, additional strength is given by good orientation and formation of fibres. Also, the process operates with very little waste.

In the process described in copending application Ser. No. 166,778, a cement sheet is produced by a centrifugal casting method, the cement mix (including water) being fed into a rotatable cylindrical mould and spun to distribute the mix evenly around the mould wall to shape the mix into a hollow cement cylinder. One end plate of the mould is removable to allow for axial removal of the cement cylinder, and in order to effect this removal a cylindrical mandrel is inserted into the mould to engage the inner surface of the cement cylinder, which is then withdrawn on the mandrel. After removal, and with the cement cylinder still in the soft or flaccid state, the cement cylinder is divided longitudinally and the resultant sheet is laid out onto a flat or curved surface and allowed to harden.

The present invention provides apparatus for performing this process, which comprises, firstly, a cylindrical mould mounted for rotation on a horizontal axis and having a removable end plate, the mould and end plate being such that a cylindrical body of cement or other material formed within the mould can be extracted by sliding without dimensional change after removal of the end plate. The apparatus also includes means for feeding a flowable hardenable material directly onto the inner surface of the mould or onto a liner therein, and a special charging device which has been designed for this purpose is described. Also, a mandrel is provided which is movable axially into the mould from the end of the mould having the removal end plate, the mandrel having a cylindrical surface engageable with the inside surface of a cylinder of the material as formed in the mould. Mounting means for the mandrel are provided which allow movement thereof axially into the mould and which also allow rotation after removal from the mould, to facilitate unrolling the final product. The mounting means may include handling means such as cranes or hoists, but preferably a special carriage is provided. Means are provided for holding the cylinder on the mandrel during removal thereof from the mould, as described more fully below. Also, slitting means are provided for forming a longitudinal slit in a cylinder of the material held on the mandrel outside the mould, although as an alternative to slitting means the mould may be provided with an inwardly projecting member arranged to form a longitudinal division in the cylinder formed in the mould. Suitable slitting means are an upwardly projecting blade, or a wire band saw, preferably applied to the underside of the soft cylinder of cement or other material while it is held on the mandrel. The apparatus also includes a surface for receiving a soft sheet of the material released from the mandrel, with means being provided to allow relative transverse movement between the mandrel and this surface with rotation of the mandrel to facilitate unrolling of the sheet from the mandrel.

The means for holding the cylinder onto the mandrel may include ports in the cylindrical surface of the mandrel, and conduit means connecting these ports to a source of vacuum, so that during removal of the cylinder this can be held onto the mandrel by vacuum. The mandrel may also be connectable to a source of compressed air to give release of the cylinder when required.

Alternatively, or additionally, the apparatus may include a liner for example of sheet metal or rubber, bendable to form a cylindrical surface within the mould, and having a longitudinal division so that it may be laid out flat with the sheet of material formed in the mould. The liner may have opposed edge portions which are adjacent while the liner is in the mould, these opposed edge portions having means for connecting them together when the mandrel is inside the cylinder so that the liner can assist in holding the cylinder onto the mandrel. The liner edge portions may be directly connected together, by means of a clip. The liner may become incorporated in the final product, or may be separated from the final sheet and re-used. The adjacent edge portions of the liner may be spaced apart (while surrounding the cylinder) so as to allow the cylinder to be slit through the gap between the edge portions.

Figure 2:
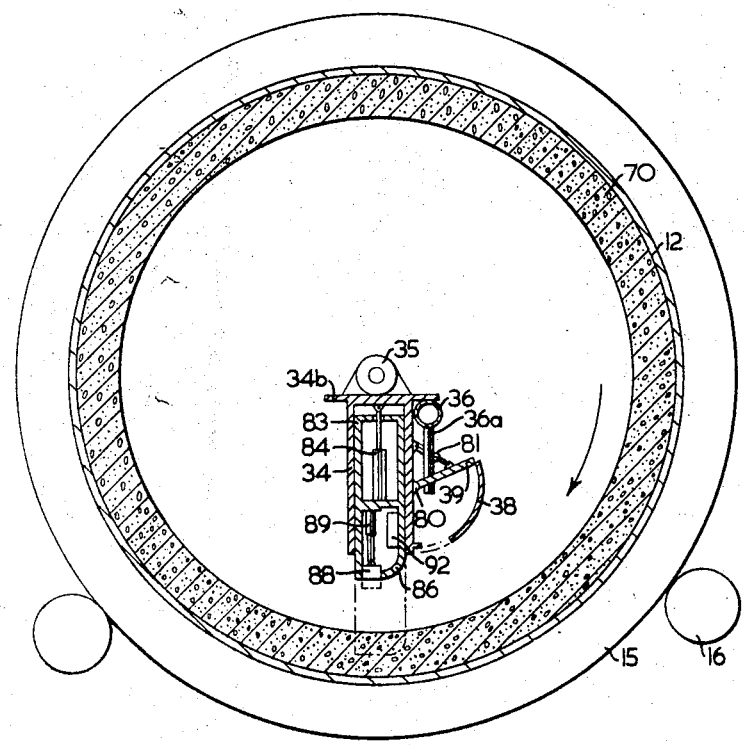
Figure 3:
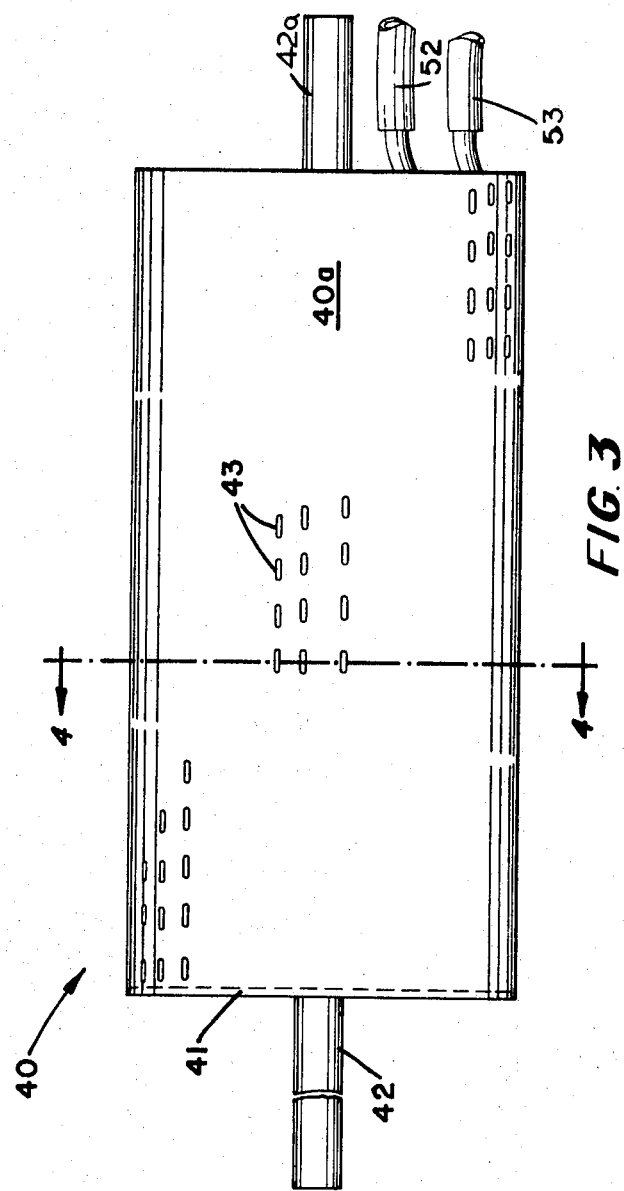
Figure 4:
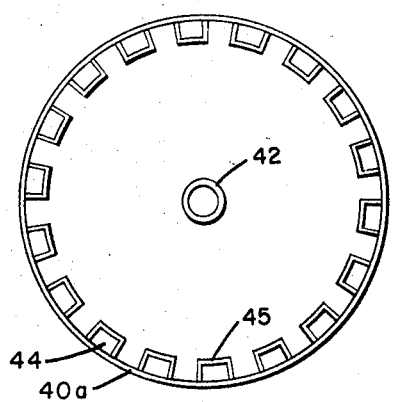
Figure 9:
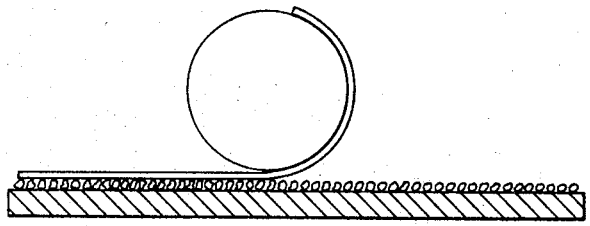
Figure 10:
Figure 5:
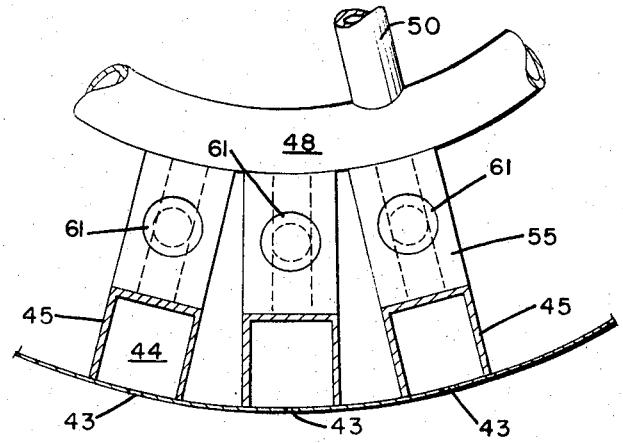
Figure 6:
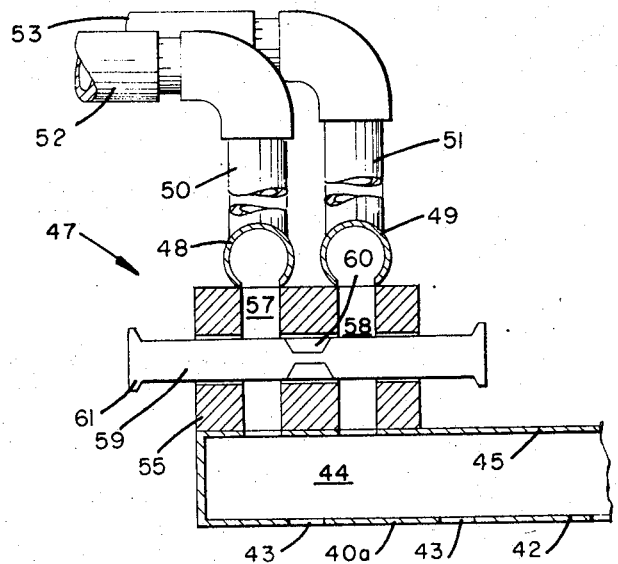
Figure 7:
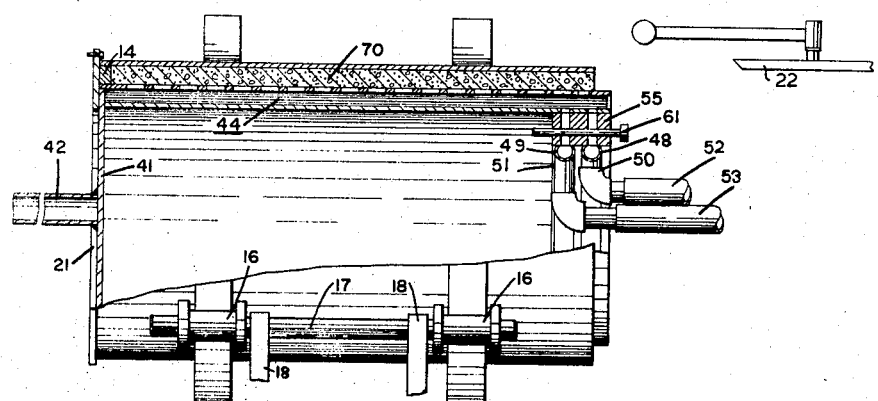
Figure 8:
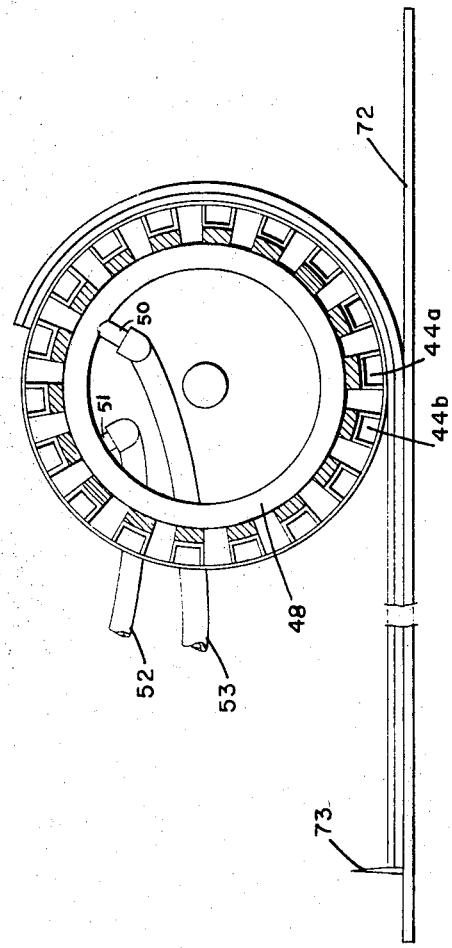
Figure 11:
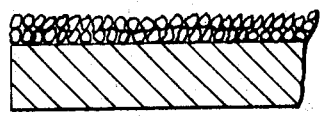
Figure 12:
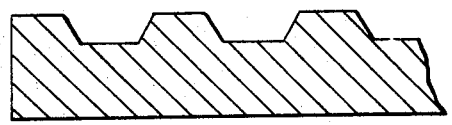
Figure 13:
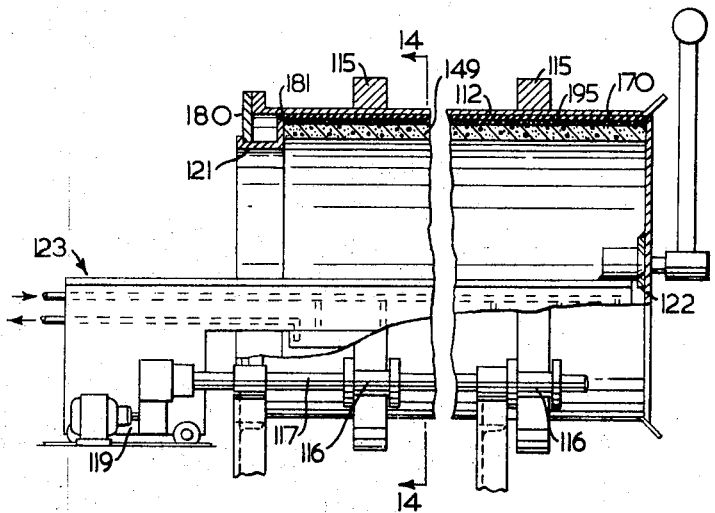
Figure 14:
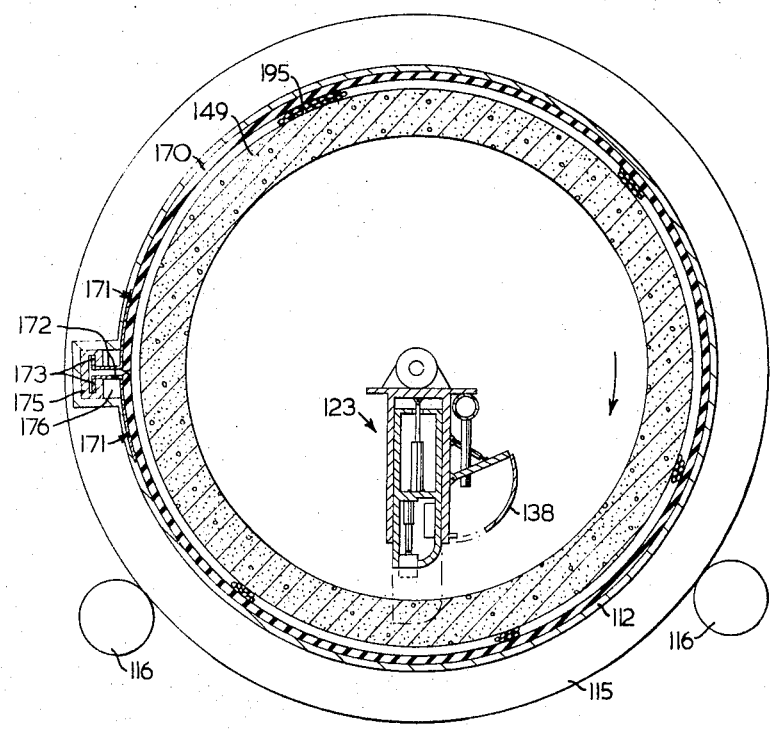
Figure 15:
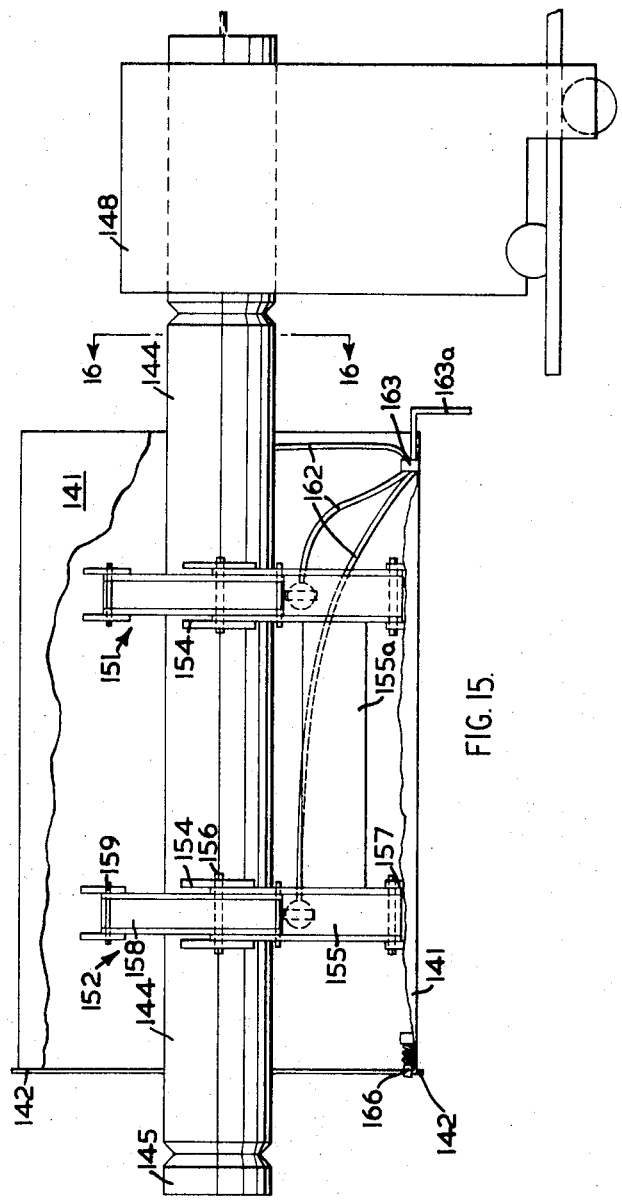
Figure 16:
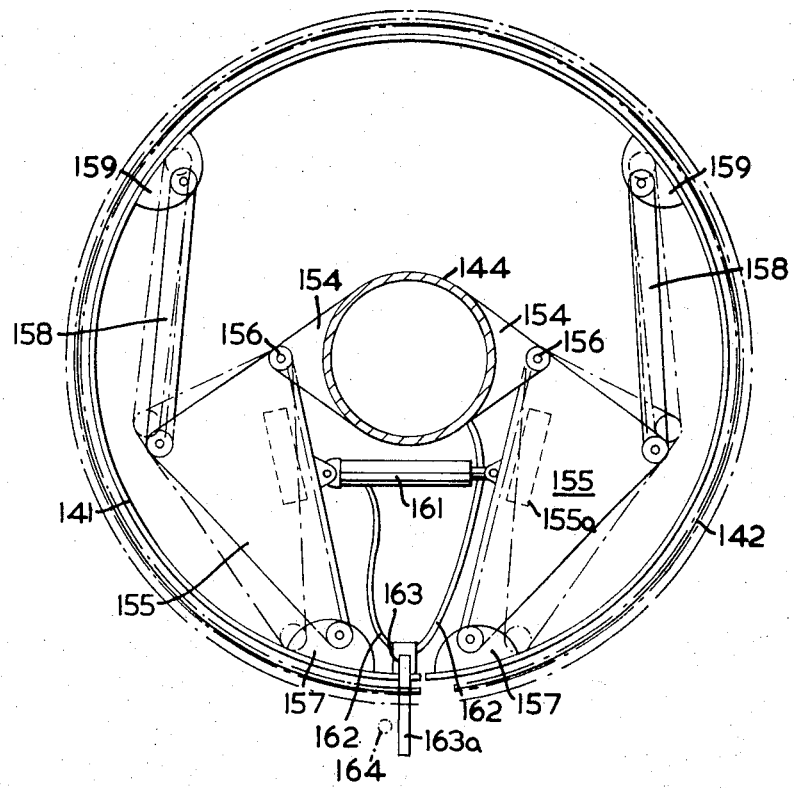
Figure 17:
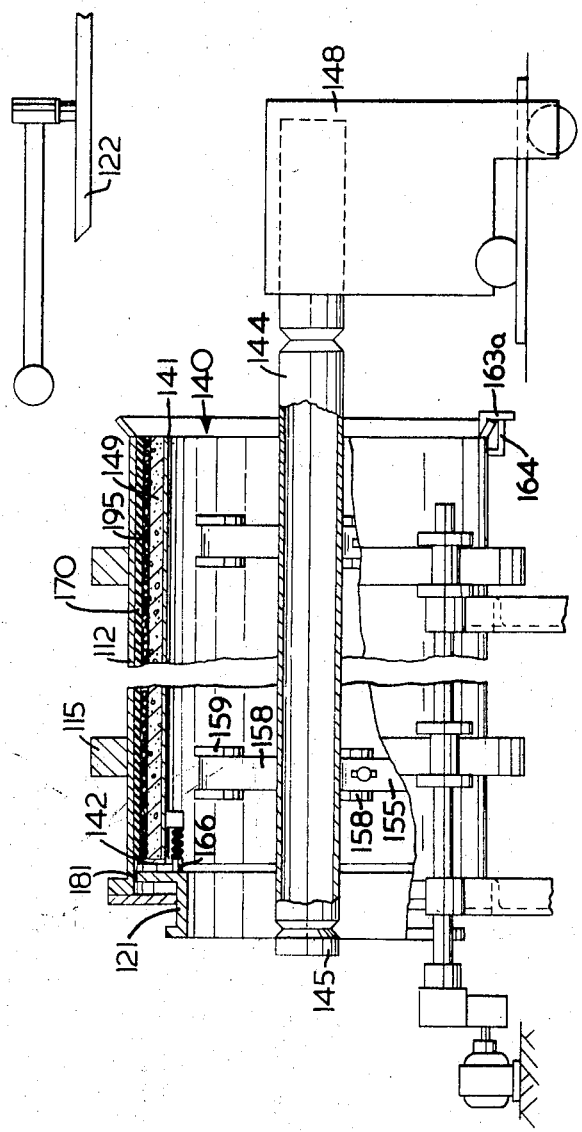
Figure 18A:
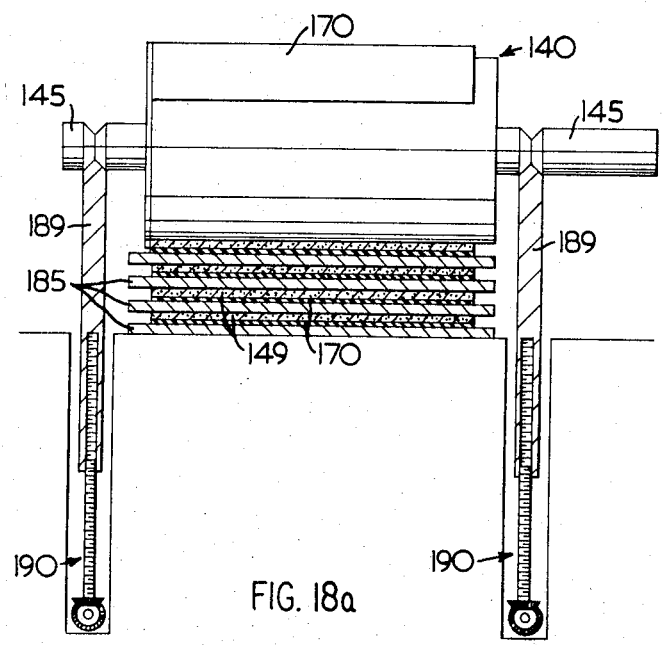
Figure 18B:
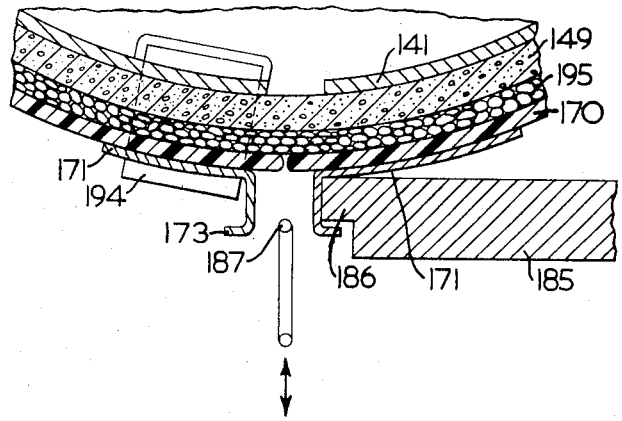
Figure 18C:
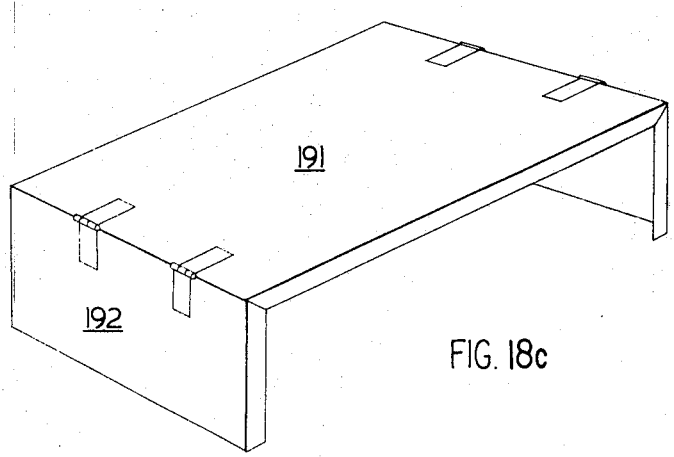
Figure 19:
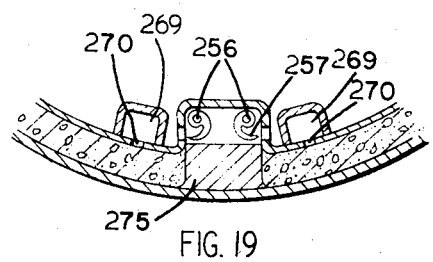
Figure 20:
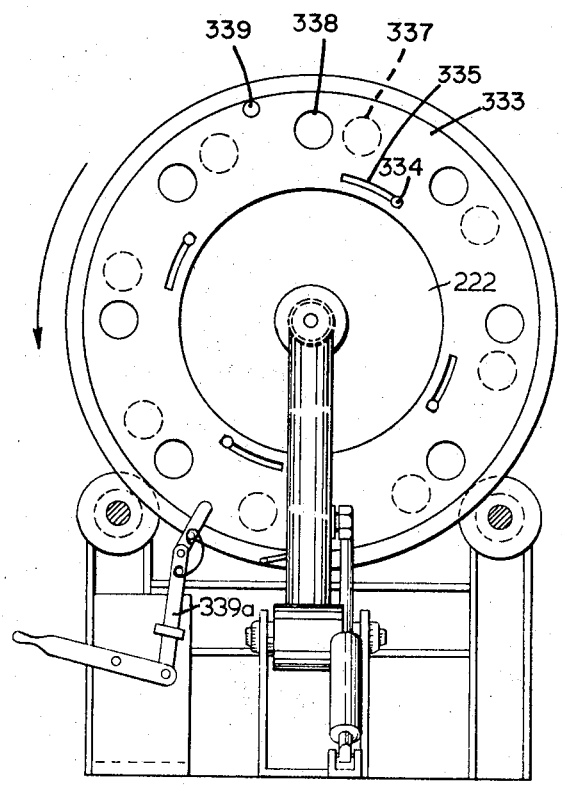

The process and apparatus will be particularly described by way of example with reference to the accompanying drawings in which:

FIG. 1 is a partly sectioned elevation of a first type of centrifugal mould for use in accordance with the invention, FIG. 2 is a cross-section through the mould of FIG. 1, FIG. 3 is an elevation of a mandrel, FIG. 4 is a cross-section through the mandrel on line 4—4 of FIG. 3, FIGS. 5 and 6 show details of the mandrel in cross-section and side elevation respectively, FIG. 7 is a sectional elevation through the mould with the cement cylinder and mandrel in place, FIG. 8 is a view of the mandrel in the last stage of the process, FIGS. 9 and 10 show variations of the basic method which produce a cement sheet with an exposed particulate surface, FIGS. 11 and 12 are edge views of special cement sheets produced in accordance with the invention;

FIG. 13 is a partly sectioned elevation of a second type of centrifugal mould for use in accordance with the invention, FIG. 14 is a cross section on lines 14—14 of FIG. 13 showing details of liner locking means, FIG. 15 is a partly broken away view of a modified mandrel for use with the mould of FIG. 13, FIG. 16 is a cross-sectional view of the modified mandrel on lines 16—16 of FIG. 15, FIG. 17 is a partly sectioned view of the mould of FIG. 13 with the modified mandrel in place, FIGS. 18a, 18b and 18c illustrate modified apparatus for slitting, laying out and curing the cement sheets, FIG. 19 shows a cross-sectional view of part of a further modified mandrel engaging a cement cylinder within a modified mould, and FIG. 20 shows an end view of a mould with modified means for removing water from the cement.

Referring to FIGS. 1 and 2, the apparatus includes a rotatable centrifugal mould indicated generally at 10. The mould has a cylindrical wall 12, which is of sheet metal and is perforated with 1/16 inch diameter holes spaced apart on 1 inch centres circumferentially and axially of the mould; these holes allow outflow of water during spinning. The mould wall 12 is reinforced by an end ring 14 secured within one end of the wall, and which is of a thickness greater than the cement cylinder to be spun; and also by reinforcing rings or tires 15 which rest on four rollers 16. The rollers 16 are carried by two parallel horizontal shafts 17, supported in bearings 18, and one of these shafts is driven by a motor and gearbox combination 19. When the motor is operated to drive the shaft 17, the frictional contact between rollers 16 and the tires 15 causes the mould to rotate about its horizontal axis.

The mould has a fixed end plate 21 and a removable end plate 22. The fixed end plate 21 is of annular form having a central aperture 21a which is large enough to allow fluid cement material to be fed into the mould by feeding means in the form of a charging head 23 to be described. The fixed end plate 21 is held by nuts on threaded studs 21b welded to the mould wall, and is removed only for maintenance or mould alterations.

The removable end plate 22 is mounted on an axially projecting stub shaft 26, which is carried in a bearing 27 supported at the end of a swing arm 28. The swing arm is pivoted at 30 and is rotatable from the closed position of FIG. 1 to the open position of FIG. 7 by means of a power cylinder 31. The inside of end plate 22 is provided with a central locating ring 33 having an inner surface which flares outwardly towards the other end of the mould, and which serves to support and locate one end of the charging head 23.

It will be apparent that the end plate 22 need not entirely cover the end of the mould, but may instead provide a cover over an annular portion only, of radial thickness greater than that of the cylinder to be spun therein.

The charging head 23, as shown in FIG. 1, is mounted on a support carriage 24 mounted on rails 24a adjacent that end of the mould with the fixed end plate. These rails allow movement of the charging head from the operative position of FIG. 1, in which the charging head extends through the fixed end plate 21, to a retracted position in which the charging head is withdrawn clear of the mould.

The charging head comprises a horizontally extending support member somewhat longer than the mould in the form of a parallel sided channel 34 open at its lower end and reinforced at its top by a horizontal plate 34b. At its outer end (remote from the carriage 24) the plate 34b carries a positioning pin 35, which, when the charging head is in the position of FIG. 1, locates in the locating ring 33 and assists in supporting the outer end of the charging head. The support member carries at one side a cement feed pipe 36, having downwardly extending distribution pipes 36a spaced along the pipe 36 at 1 foot spacing. Below the lower ends of pipes 36a there is provided a curved shutter 38 which, when in the closed position shown in broken lines, co-operates with the outside of the channel 34 to provide a trough suitable for retaining a quantity of particulate material. The shutter 38 is mounted on radial arms 39 pivoted to the support member at 80 and pivotally movable relative to the support member by fluid cylinder 81 to move this shutter into the open position shown in full lines, allowing material held in the shutter to be released onto the inside of the mould or to be fed directly into the mould from discharge pipes 36a.

The channel 34 accommodates a hollow, parallel sided member 83 vertically slidable therein under the control of hydraulic cylinder 84. The lower end of member 83 has a curved corner joining the vertical side of the member 83 with the horizontal lower edge thereof, this curved corner facing the direction of rotation of the mould which direction is indicated by the arrow. This curved corner and the adjacent surfaces of member 83 form spreader means 86 having a hard facing and capable of contacting the inner surface of a hollow cylinder of material being fed into the mould, to assist in evenly spreading the material within the mould. During the stage in which material is being fed into the mould via pipes 36a, the spreader means is caused to rise at a steady rate under control of fluid cylinder 84.

The member 83 also incorporates means for removing water from within the centre of the cylinder of material being spun within the mould, in the form of a skimmer 88 which is movable by fluid cylinder 89 between a retracted position in which it does not extend below the surface of the spreader means, to an extended position as shown in broken lines in which it projects below the lower surface of the spreader means. The skimmer 88 has an opening facing the direction of rotation of the mould, and which communicates with a water discharge pipe 90 extending along the member 83.

The member 83 also incorporates a vibrator 92 mounted on the inside of the spreader means and arranged to cause vibration of the spreader means for compacting material in the mould.

The apparatus also includes a special cylindrical mandrel 40, which is shown in FIGS. 3 to 7. The mandrel has a cylindrical outer wall 40a, the diameter of which is selected so that this can be inserted into a cement cylinder which has been formed in the mould. The diameter of the mandrel is such that the cylindrical surface of this is engageable with the inside surface of the cement cylinder without dimensional change of the latter. An outer end of the mandrel is closed by an end plate 41 (see FIG. 7), to the centre of which is welded a guide member 42 in the form of a tubular shaft. The guide member 42 is longer than the length of the mould, so that it can be used to guide the mandrel into the mould. The other end of the mandrel has a shorter shaft 41a projecting axially therefrom.

The mandrel wall 40a is pierced by longitudinal rows or ports 43, and each row of ports communicates with a longitudinal channel 44 within the mandrel. These longitudinal channels, which are shown in cross-section in FIGS. 4 and 5, are constituted by channel members 45 having their outer edges welded to the inside of the wall 40a, each row of ports 43 being centrally positioned along a channel member. FIGS. 5 and 6 show valve means 47 which allow one end of each channel 44 to be individually placed in communication selectively with a vacuum header tube 48 or a compressed air header tube 49. These header tubes 48 and 49, which are shown in FIGS. 5 to 7, are toroidal tubes of equal dimensions positioned close together near to one end of the mandrel, and connected by radial conduits 50 and 51 and elbow connectors respectively to flexible hoses 52 and 53. The hoses 52 and 53 serve to connect the header tubes 48 and 49 to sources of vacuum and pressurized air respectively, while allowing for rotation of the mandrel by at least one revolution.

The valve means 47, one of which is provided for each of the channels 44, comprises a valve body 55 in the form of a rectangular block having its inner surface supported by the header tubes 48, 49 and having its outer surface fixed to a channel member 45. The valve body has two radial bores 57 and 58 leading respectively from header tubes 48 and 49 into the channel 44, and a valve member 59 is slidable in an axial bore in the valve body to control flow of air through these radial bores. The valve member 59 has a central recessed portion 60; in the position shown in FIG. 6 this recessed portion is between the radial bores 57 and 58 and the valve member prevents flow of air through either bore. By pulling out an extension 61 of the valve member, the recessed portion 60 is brought into registry with the bore 57, so that the channel 44 is put into communication with the source of vacuum through header 48 and hose 52; and when the valve member is pushed inwardly to bring recessed portion 60 into register with bore 58 then the channel 44 is placed in communication with the source of compressed air via bore 58, header 49, and hose 53.

A curved operating member may be rotatably mounted at the outer end of the mandrel, and arranged to engage the valve member as it rotates relative to the mandrel to move these from the vacuum position to the compressed air position.

FIG. 7 is a view of the mould with a spun cement cylinder in place, and with the mandrel inserted to contact the inner surface of the spun cement cylinder, which is indicated at 70. It will be seen that the mandrel is an easy clearance fit within the cement cylinder, and that the end of the mandrel fits within the reinforcing ring 14.

The apparatus also includes mounting means for the mandrel which may be in the form of known handling means such as a small factory crane or hoist, and which supports the mandrel by its axial shafts 42 and 42a. The mounting means must allow axial movement of the mandrel into the mould, and must also allow rotation of the mandrel by at least almost 360° with relative transverse movement between the mandrel and the surface which receives the cement sheet, for releasing and unrolling the cement sheet from the mandrel in the manner to be described.

The only other essential parts of the apparatus are slitting means for forming a longitudinal slit in the cylinder of soft cement held on the mandrel, after removal from the mould; means for causing relative movement between the slitting means and the mandrel to form the longitudinal slit, and a surface onto which the cement sheet can be laid after removal from the mandrel.

In the simplest apparatus, the slitting means may be a blade, such as blade 73 of FIG. 8, projecting upwardly in fixed position, and associated with the receiving surface 72, the blade having a length at least equivalent to that of the mandrel and having a width greater than the thickest sheets to be produced. In this embodiment, the means for causing relative movement between the slitting means and the mandrel will be the handling or mounting means of the mandrel which allow this to be lowered onto the blade 73. The receiving surface may be provided by a pallet which can be located suitably in relation to the slitting blade 73 for receiving a cement sheet removed from the mandrel, and which is then removable to another location where the cement sheet hardens. The receiving surface 72 may be a plain flat surface or curved, or may have a relief design thereon for producing a corresponding relief design in the cement sheet. In the latter case, the apparatus will also include a standard type of hydraulic or other press by means of which pressure can be applied to the top surface of the cement sheet to cause the lower surface to assume the shape of the pallet surface.

The process of the invention will now be particularly described with reference to FIGS. 1 to 8.

Operation of the apparatus in the simplest manner, to produce a cement sheet without incorporation of fibres and without laminations, will now be described.

The charging head 23 is firstly advanced into the mould on rails 24a, to the position of FIG. 1, and the removable end plate 22 is closed. The cylinder 84 is actuated to bring the spreader means 86 close to the mould surface, and cylinder 81 is operated to open the shutter 38 to the position shown in full lines. A cement mix is then fed onto the mould surface via the pipes 36 and 36a, and simultaneously the cylinder 84 is operated to raise the spreader means 86 gradually, so that these maintain contact with the cement mix and ensure that this is spread evenly within the mould. The cement mix is fed in while wet (with about 70 percent water) and rotation of the cylinder at a peripheral speed of 1200 ft/min. for about five minutes causes the wet cement to form a cylindrical layer of uniform wall thickness on the inside of the mould. The centrifugal effect also concentrates and compacts the solid particles of the mix in the outer parts of the cement layer, and excess water which does not flow out of the perforations in the wall of the mould is forced to the center of the mould and flows out of this during a de-watering stage.

The use of a cement mix containing only 70 percent water is in contrast to other methods where more than 90 percent excess water is required.

The de-watering stage is reached after the material has spun sufficiently to compact the solids into cylindrical form and to form an inner layer of excess water. This takes about one minute. At this stage the cylinder 89 is operated to cause skimmer 88 to protrude from the lower surface of the spreader means, and cylinder 84 is operated to move the member 83 downwardly until the skimmer contacts the layer of water within the mould. The water is then skimmed off by pumping this through discharge pipe 90. In the final stages of de-watering, the spreader means 86 is brought into contact with the cement cylinder, and the vibrator 92 is activated to cause vibration of the spreader means, and compaction of the cement, while the mould continues to spin.

At this stage rotation of the mould is stopped, and the end plate 22 is removed to the position shown in FIG. 7 by operation of cylinder 31. The cylindrical mandrel 40 is then positioned in the mould, by suitable handling means, into the position of FIG. 7.

When the mandrel is in place (as shown in FIG. 7) the valve members 61 are operated to connect the channels 44 to the source of vacuum so that the cement cylinder, which is already contacting or almost contacting the mandrel surface, is forced against the surface by atmospheric pressure. The mandrel is then withdrawn from the mould, and subsequently the cement cylinder is slit by being lowered, while still on the mandrel, onto the blade 72 so that this slits the cylinder longitudinally. The mandrel carrying the cement cylinder is then rolled along, i.e., moved transversely over the surface 72 while being simultaneously rotated, so that the cement sheet is laid out on the surface 72 (FIG. 8) During removal of the cement sheet the valve members 61 are operated successively to cause the lowermost channels 44 of the mandrel (e.g. channels 44a and 44b of FIG. 8) to be connected to a source of positive air pressure to assist the removal of the cement sheet from the mandrel. The valve members 61 of channels from which the cement sheet has been removed are returned to the neutral position of FIG. 6.

Preferably, the cement sheet so produced is subjected to a final pressing operation as between the platens of a press, this giving greater strength and density to the product. Subsequently, the cement sheet is hardened by curing in known manner. Also, the cement sheet may be rolled off the mandrel onto a platen having a relief design, the cement sheet being pressed onto the platen to reproduce the design.

It may be noted that the mandrel not only facilitates removal of the cement cylinder from the mould, and the slitting of this, but also enables the cement sheet to be rolled and compacted while being laid out.

In another process using the apparatus of the invention, the material first fed into the mould is a particulate material mixed with cement and water or any suitable bonding agent. The particulate material may be aggregate, or particles of glass, or metal, or of plastics material. As before, this particulate material is fed in while the mould is rotating, and rotation is continued until the material has formed a uniform layer within the mould.

The shutter 38 provides convenient means for supplying the particulate material to the inner surface of the mould. Before the charging head 23 is advanced into the mould, the shutter 38 is closed by cylinder 81, and the trough formed between shutter 38 and the side of member 34 is filled with the particulate material. After the charging head is in position in the mould the shutter 38 is opened to release the particulate material onto the inner surface of the mould. This material is then evenly spread in the mould by operation of the spreader means 86. Subsequently, a cement mix is fed into the mould, and the mould is spun to produce a flaccid laminated cement cylinder having the particulate material bonded to the outer layer. The cement cylinder is removed from the mould on the vacuum mandrel, as described above, slit, and the cement sheet laid out to harden. The surface of the cement sheet may then be polished to provide a flat surface in which the particulate material is exposed.

Instead of being a plain flat surface, e.g., the surface of a pallet, the receiving surface may be such as to be capable of becoming bonded to the soft cement sheet. One example of this is illustrated in FIG. 9, which shows a soft cement sheet being laid out onto a bed of aggregate material. Bonding of the soft cement sheet to the granular material is achieved firstly by using the mandrel in the manner of a roller, and then by pressing the resultant product between the platens of a press. The final product is illustrated in FIG. 11. Instead of using a bed of particulate material, the soft cement sheet can be laid out on a sheet already prepared according to the process, so that a thick laminate can be built up.

In the process of FIG. 10, an asbestos cement sheet which has been produced in accordance with the invention, as described, is laid out flat on a pallet, but before the sheet hardens aggregate material is sprinkled on the sheet, and pressed in, and the sheet is then allowed to set.

FIG. 12 shows a portion of a cement sheet having a sculptured or relief design surface. This can be made by laying out a soft sheet onto a pallet having a corresponding relief design surface, and pressing the soft sheet into place by means of a press.

Also, instead of the mandrel being moved transversely over the receiving surface, the surface may be arranged on a carriage for movement underneath a stationary, but rotatable, mandrel.

Additionally, cement sheets with liners bonded thereto may be produced by inserting a liner into the mould before adding the cement, so that cement cylinder becomes bonded to the liner. The bond can be strengthened by chemical bonding with a latex product such as "Albitol" (registered trade mark), applied to the inner surface of the liner. A gap may be left between the adjacent edges of the liner, to allow for slitting by the blade 73. Alternatively the liner itself may form the longitudinal division in the cement cylinder as particularly described in co-pending Patent application Ser. No. 166,780. Liner materials may be of metal, plastics or rubber.

The liners used may be plain and imperforated, in which case a non-perforated mould would be used and all the excess water would be removed from the centre of the hollow cylinder produced. A plain liner may be used with the vacuum mandrel described or with the different types of apparatus shown in FIGS. 13 to 18.

However, one type of liner which is particularly useful with the perforated mould just described is a wire mesh liner having its surface mainly formed of a fine wire mesh of about 75 wires to the inch (both ways), and similar to the wire mesh or wire cloth used on paper-making machines of the Fourdrinier type. This wire mesh liner when used in the mould having a perforated cylindrical wall, allows a large amount of water to be removed by centrifugal action during spinning, thus resulting in a dryer, denser and stronger product than that produced with a plain liner. The liner is normally stripped from the cement sheet before this hardens, and is re-usable. The wire mesh may be used in conjunction with other laminating steps described for example a layer of aggregate, or exposed particles of glass or metal may also be incorporated in the cement sheet.

The cement sheets produced in accordance with this invention can be further treated by drying when hard at temperatures of 105°C or higher, soaking in a liquid monomer such as methyl methacrylate, and curing it to polymerize the monomer. Polymerization can be achieved by irradiating the impregnated cement or by heating the cement to 75°C for 2 hours with 2 percent benzoyl peroxide added to the monomer as a catlyst. This process gives much improved physical properties to the cement sheet, and also makes it impermeable.

A different form of apparatus for performing the same basic process, but in which the mandrel is fully rotatable when inserted in the mould, will now be described with reference to FIGS. 13–18.

FIGS. 13 and 14 show moulding apparatus generally similar to that of FIGS. 1 and 2, but adapted for use with the modified form of mandrel shown in FIGS. 15 and 16.

The apparatus of FIGS. 13 and 14 is similar to that previously described in having a rotatable mould with a cylindrical wall 112 held by rings 115 resting on rollers 116 mounted on shafts 117 driven by a motor and gearbox combination 119. Unlike in the first embodiment, however, the mould wall 112 is not perforated. The dimensions of the mould are about 10 ft (3 meters) length and about 6 ft (1.8 meters) in diameter. The mould has a removable end plate 122 which again is the same as that of the first embodiment. At the end of the mould opposite the plate 122 however the construction is different from the first embodiment, in that it incorporates an axially movable annular member 121 hereinafter referred to as a void ring, which will now be described.

The void ring 122 is of channel form, having an outwardly facing opening engaged by an annular plate 180 which is bolted to the end flange of the mould. The void ring is movable axially of the mould between the positions shown in FIGS. 13 and 17, and sealing means 181 provide a seal between the inner flange of the ring and the inner surface of the mould. The void ring 121 has a radial dimension greater than that of the thickest cylinders to be spun within the mould, and has interior dimensions large enough to allow space for entry of the charging head 123 which is identical to the charging head 23 already described with reference to the first embodiment, and which is shown in cross section in FIG. 14.

FIG. 14 also shows a special form of liner 170 used in this second embodiment. This liner is a sheet of abrasion resistant rubber of one-half inch (12 mm) thickness sufficiently flexible to form a cylinder lining the mould as shown. The liner has opposite edge portions which are adjacent while the liner is in the mould, the edge portions being bonded to sheet metal edge pieces 171. The edges of the liner extend beyond the edge pieces 171 to form a seal preventing cement or other material from passing between the edge pieces 171. The edge pieces 171 are provided with radially outwardly directed flanges 172, and the outer edges of these flanges have lips 173 bent back parallel to the liner surface and forming a recess therewith. The recesses are engageable by the inwardly directed jaws of a locking clip 175, the cross-sectional form of which is shown in FIG. 14, and which is accommodated in a suitably shaped longitudinal groove 176 in the mould surface. The clip 175 thus co-operates with the edge pieces 171 to hold the edge portions of the liner together when the cylinder and liner are removed together from the mould, as will be described, thus holding the cement cylinder on the mandrel when removed from the mould. To facilitate removal from the mould, the outside surface of the liner, and the inside surface of the mould, are coated with polytetra-fluoroethylene.

The modified mandrel 140 used with this mould is an expanding mandrel as shown in FIGS. 15 and 16. The mandrel includes a cylindrically curved surface formed by a slightly flexible metal plate 141, the longitudinal edges of which are close together when the plate 141 is unstressed and is at its minimum diameter as indicated in full lines in FIG. 16. The plate 141 has an annular end flange 142 at one end, and is capable of being expanded by means to be described to the condition shown in broken lines in FIG. 16, the amount of radial expansion being greater than the radial depth of flange 142.

The mandrel is mounted on a tubular shaft 144 carried at its inner end by a rail mounted carriage 148, the carriage allowing axial movement of the mandrel into the mould and also allowing free rotation of the shaft 144. The shaft 144 has an extension 145 at the outer end of the mandrel (i.e., that remote from the carriage 148), which serves a purpose to be described. The shaft 144 carries two axially spaced expanding arrangements 151 and 152 by which the plate 141 is connected to the shaft 144. Each expanding arrangement comprises two opposed pairs of gussets 154 welded to shaft 144, and two symmetrically arranged triangular crank members 155 each having a first corner pivoted at 156 to gussets 154, a second corner pivoted to gussets 157 which are welded internally to plate 141 near to the longitudinal edges thereof, and a third corner pivotally connected by links 158 to gussets 159. The crank members 155 of expanding arrangements 151 and 152 are connected for movement together by plate 155a. Also, both crank members 155 and links 158 are of channel form having parallel side plates or flanges connected by a web. The gussets 157 are welded to the inside of plate 141 at locations spaced away from gussets 157, being on the opposite side of a plane through pivots 156 from these gussets 157. The spacing between adjacent gussets 157 and 159 is roughly equivalent to that between the two gussets 159, this spacing being of the order of 100° to 120° of arc subtended at the axis of shaft 144. The two crank members 155 are arranged to be urged apart by a pneumatic cylinder 161, this cylinder being connected by a flexible conduit 162 via a rotary valve 163 to an air space within the hollow shaft 144. The space within the shaft 144 is closed apart from the conduit 162 and a quick connector coupling by means of which a charge of compressed gas can be admitted into this space. The valve 163 is biassed into a shut position, but is arranged to be opened by rotary movement which occurs when the valve arm 163a, extending radially from the inside end of the mandrel, is pivoted sideways by contact with an arm 164 which rotates with the mould. Admission of pressurized air into cylinder 161 is arranged to cause extension of this cylinder, with consequent outwards movement of members 155 and expansion of the plate 141 into the broken line position. The pivotal movement of valve arm 163a is limited so that after the valve 163 has been opened by arm 164 of the mould these arms continue to engage with each other causing rotation of the mandrel with the mould. The arms 163a and 164 are so situated on the mandrel and mould respectively as to cause the mandrel to be rotated with the mould in such position that the adjacent longitudinal edges of the plate 141 forming the mandrel surface are disposed adjacent the junction in the liner 170 (see FIG. 14), so that after expansion of the mandrel a gap is provided in the cylindrical surface of the mandrel which gap underlies that between the flanges 172 of the liner.

The outer end of the mandrel is provided with a protruding spring loaded plunger 166, positioned to engage the void ring 121 so that this void ring is pushed away from a cement cylinder formed in the mould on positioning of the mandrel in this cylinder.

In operation, the end plate 122 of the mould is placed in the closed position, and the void ring 121 placed in the inner position shown in FIG. 13. Cement with or without other material is then fed into the mould while this is spun, the process being generally as hitherto described for the first embodiment. As shown in FIG. 14, a cement cylinder 149 is formed in the liner 170, the outside of the cylinder having an aggregate facing 195. This is produced by initially distributing aggregate from the trough of the charging machine formed by shutter 138, generally as previously described. The void ring 121 defines an end of the cylinder remote from the removable plate 122.

Once a hollow cement cylinder has been formed, and the de-watering and compacting steps have also been performed as described for the first embodiment, the space within the shaft 144 is charged with compressed air, and the mandrel 140 is inserted into the cylinder, while the cylindrical mandrel surface formed by plate 141 is in its relaxed, contracted state, and while the mould is still spinning.

As the mandrel approaches the position shown in FIG. 17, the plunger 166 pushes the void ring 121 away from the end of the cement cylinder 170, to the position shown in FIG. 17. In the latter stages of this movement, the flange 142 passes beyond the end of the cement, allowing expansion of the mandrel to occur. In this latter stage also, the valve arm 163a of the non-rotating mandrel strikes the arm 164 of the rotating mould, causing, firstly, rotation of the mandrel with the mould, and secondly opening the valve 163 to allow pressurized air to pass via conduits 162 from the interior of shaft 144 to air cylinder 161. Air cylinder 161 then expands, causing expansion of the outer surface of the mandrel into contact with the interior of the cement cylinder 170, with consequent expansion of the flange 142 into the space between the end of the cement cylinder and the void ring 121. Rotation of the mould is then stopped, the parts being then positioned as shown in FIG. 17. The carriage 148 is then withdrawn, carrying the mandrel which in turn causes the cement cylinder 149 together with liner 170 to be slid (without dimensional change) from the mould. During this movement, flange 142 acts as extracting means engaging the outer end of the cement cylinder and preventing the cement cylinder and liner from sliding off the mandrel.

FIGS. 18a and 18b show further means for slitting the cylinders and laying out the resultant sheets, particularly for use in connection with the apparatus of FIGS. 13 to 17. As shown, a series of similar pallets 185 is provided, each having a lug 186 extending along one edge and adapted to engage in the recesses of edge pieces 171 of the liners. As shown in FIG. 18b just outside the lug 186 and parallel thereto is situated one strand 187 of a wire band saw, which saw is vertically movable relative to the pallet.

At each side of the pallets 185 is situated a vertical wall 189, having a horizontal tapered upper edge suitably spaced to engage an annular recess in the support shafts 144, 145 of the appropriate end of mandrel 140, as shown in FIG. 18a. The walls 189 are adjustable in height by raising means indicated at 190. When raised to their full height, the walls 189 are capable of forming a steam curing chamber when combined with the parts shown in FIG. 18c. These parts comprise a top 191 suitable for covering the space between walls 189, and hinged end pieces 192 sized to close the ends of the chamber.

In operation of the apparatus shown in FIG. 18, a first pallet 185 is laid between the walls 189 while the walls are in a lowered position. After a cement cylinder has been removed from the mould on the mandrel 140, the mandrel is positioned directly above the band saw 187, with its support shafts 144, 145 supported at one end of walls 189, and with the liner edge portions positioned as shown in FIG. 18b. The clip 175 is removed from the liner, and one edge portion only of the liner is then re-attached to the mandrel by two U-clips shown at 194, which have opposed flanges engaging the inside of the mandrel and the outside of the edge piece 171, one clip being used at each end of the mandrel. The other edge portion 171 is engaged by lug 186 as shown in FIG. 18b. The wire band saw 187 is then operated and moved vertically to cut through the cement cylinder, the saw passing between the liner edge portions, by deflecting the edge portions where they abut, and also passing through the gap between the longitudinal edges of plate 141. The cylinder and liner are then rolled out flat on the pallet 185, with one end of the liner remaining attached to the pallet and the other end remaining clipped to the mandrel until unrolled. During this unrolling operation, the mandrel support shafts 144 and 145 roll and slide along the top edges of walls 189, the movement of the mandrel being such as to stretch and roll the sheet of cement.

After a first sheet of cement has been laid out as described, a further pallet 185a is laid thereon, and the next sheet is laid on this further pallet, this operation being repeated until a stack of pallets interposed with sheets of cement and liners is produced. As successive sheets of cement and pallets are laid down, the walls 189 are raised by raising means 190, so as to continue to support the mandrel during each unrolling operation. After a stack of about twenty cement sheets has been laid out in this manner and with the walls 189 raised to their maximum height, a curing chamber is formed by arranging on these walls the top 191 and end pieces 192 as shown in FIG. 18c. The stack of cement sheets is then steam cured to harden them, after which the sheets are removed and the pallets and liners recovered for re-use. It may be noted that, unlike in the first embodiment, the sheets are cured and hardened without being moved from the position in which they are laid out.

The liners may be re-used by being bent up around a suitable mandrel, and cleaned on their external surfaces before being inserted into the mould. After insertion into the mould the inner surfaces are cleaned and oiled while the mould is slowly rotated.

In a further modification of the process, no liner is used, but instead of using a slitting step as in the methods described with reference to FIGS. 1 to 18, the longitudinal division of the cement cylinder is formed by an inwardly projecting member fixed to the mould surface and having a radial dimension greater than that of the cement cylinder to be formed. The mandrel used in this modified process is a vacuum mandrel, that is a cylindrical hollow mandrel having ports in its surface, and means for applying vacuum to these ports. The mandrel may be of the type described with reference to FIGS. 3 to 8, having longitudinal channels communicating individually with longitudinal series of ports, each channel being individually connectable to a source of vacuum or pressure.

FIG. 19 shows a partial cross-sectional view of a combination mandrel, which is usable with a liner having elements attachable to hooks of the mandrel, as described in co-pending Application Ser. No. 166,780, and is also equipped for use as a vacuum mandrel where no liner is used. The outline form of the mandrel is similar to that of FIGS. 4 and 5, the mandrel surface being provided with ports 270 to which a vacuum or positive pressure can be applied. The internal construction of the mandrel is very similar to that of the mandrel described with reference to FIGS. 3 to 8, and includes a series of longitudinal channels each communicating with longitudinal series of ports 270, and each being individually connected to a vacuum header tube and a pressure header tube by valve means. The valve means are individually operable to place the ports of any longitudinal series in communication with either the vacuum or pressure header. The mandrel also has a longitudinal recess accommodating hooks 257 as described in co-pending application Ser. No. 166,780. When the mandrel is inserted in a mould (not having a liner), the valves are operated to connect all of the ports to the vacuum, and the vacuum is maintained until the cement sheet has been placed on a pallet. Once the cement sheet begins to be unrolled, the valves are operated to change successive series of ports from vacuum to a positive pressure, thus aiding gradual release of the cement sheet from the mandrel.

When used for the vacuum type process, this combination mandrel is used in association with a longitudinal inwardly projecting member indicated at 275 in FIG. 14, which fits within the longitudinal recess of the mandrel and which forms a longitudinal division in the cement cylinder, so that no slitting means are required.

FIG. 20 shows a de-watering device applied to the removable end plate of the mould, and which may be used in any of the above described moulds instead of the skimmer associated with the charging head. The end plate (shown as 222), incorporates an annular plate ring 333 covering the outer part of end part of end plate. The plate ring 333 is held in contact with the end plate by retaining bolts 334 which are movable in curved slots 335 in the plate ring 333, so that this ring can be rotated with respect to the end plate. The end plate and plate ring 333 are provided with water outlet holes 337 and 338 respectively which are aligned in one rotational position of the plate ring, to allow water to flow from the mould, but in the rotational position shown in FIG. 20 the holes 337 are displaced from holes 338 so that water cannot escape through these. The plate ring 333 is provided with an arm 339 which can contact a spring loaded trip stop 339a while the mould is rotating, so causing the plate ring 333 to rotate to bring holes 337 and 338 into correspondence so that excess water in the mould can escape.

The embodiments of the invention in which an exclusive property or privilege is claimed are defined as follows:-

1. Apparatus for forming into sheet form a flowable hardenable material such as a cement mix, comprising:
   a. a cylindrical mould mounted for rotation on a horizontal axis and having a removable end plate, said mould and end plate being such that a cylindrical body formed within the mould can be extracted by sliding without dimensional change after removal of said end plate;
   b. means for feeding said material directly onto the inner surface of said mould or onto a liner therein,
   c. a mandrel movable axially into the mould through the end of the mould having the removable end plate, said mandrel having a cylindrical surface engageable with the inside surface of a cylinder of the material as formed within the mould by spinning,
   d. mounting means for said mandrel allowing movement thereof axially into the mould and also allowing rotation thereof after removal from the mould,
   e. means for holding said cylinder on the mandrel during removal thereof from the mould,
   f. slitting means for forming a longitudinal slit in a cylinder of the material held outside the mould on said mandrel,
   g. means for causing relative movement between said slitting means and said mandrel to form said longitudinal slit, and
   h. a surface for receiving a soft sheet of the material released from the mandrel, means being provided to allow relative transverse movement between said mandrel and said surface with rotation of the mandrel to facilitate unrolling of the sheet from the mandrel.

2. Apparatus according to claim 1 further comprising spreader means mounted for movement radially of the mould to contact the interior surface of material being spun in said mould to assist in evenly spreading said material.

3. Apparatus according to claim 3 further comprising a vibrator attached to said spreader means arranged to cause vibration of said spreader means for compacting the material in the mould.

4. Apparatus according to claim 1, further comprising means for skimming water from within the cylinder of material being spun within the mould.

5. Apparatus according to claim 1, wherein said mounting means for the mandrel permits free rotation of the mandrel when inserted into the mould.

6. Apparatus according to claim 5, wherein interengaging means are provided on said mandrel and on said mould to cause the mandrel to rotate with the mould upon insertion therein.

7. Apparatus according to claim 1, wherein said mounting means for the mandrel includes shafts extending axially from each end of the mandrel, carriage means mounting one of said shafts and allowing axial movement of the mandrel into the mould, and horizontal track means for transversely mounting said shafts after removal of the mandrel from the mould, said track means being disposed at opposite sides of said surface for receiving the sheet of material and allowing rotation and sliding of the shafts thereon.

8. Apparatus according to claim 7, wherein said track means are vertically movable in unison whereby successive sheets of the material may be laid down at successively higher levels to form a pile.

9. Apparatus according to claim 1 wherein said mould includes an annular member situated in said mould so as to define an end of said cylinder remote from that end adjacent the removable end plate, said annular member being movable axially of the mould and away from the end of said cylinder formed therein, and wherein said means for holding the cylinder on the mandrel includes extracting means contractible to the internal diameter of a cylinder formed within the mould and expandible into a space formed between said annular member and the cylinder on movement of said member away from the formed cylinder, whereby the said extracting means can engage the end of the cylinder remote from the removable end plate to hold the cylinder on the mandrel while the mandrel is withdrawn from the mould.

10. Apparatus according to claim 1, wherein said means for holding said cylinder on the mandrel includes ports in the cylindrical surface of the mandrel and conduit means connecting said ports to a source of vacuum, valve means being provided for disconnecting selected ports during unrolling of the sheet from the mandrel.

11. Apparatus according to claim 1, wherein said slitting means extends along the full length of a cylinder of material held by the mandrel.

12. Apparatus according to claim 11, wherein said slitting means is a blade.

13. Apparatus according to claim 11, wherein said slitting means is a wire band saw.

14. Apparatus according to claim 1, further comprising a liner of sheet metal, plastics, or rubber, bendable to conform to the inner surface of the mould and capable of being laid out flat with the sheet of material formed in the mould, said liner having opposite edge portions which are adjacent while the liner is in the mould, said opposite edge portions having means allowing these edge portions to be connected together so that the liner can assist in holding the cylinder on the mandrel.

15. Apparatus according to claim 14, wherein the opposite edge portions of the liner include outwardly directed flanges which flanges are spaced apart while the liner is in the mould so that after extraction from the mould the cylinder of material can be slit while the liner is still in place.

16. Apparaus according to claim 15, wherein said apparatus further includes clip means adapted to engage said outwardly directed flanges of the liner when the cylinder is being removed from the mould, said clip means being removable to allow said slitting means to pass between the liner edges.

17. Apparatus for forming into sheet form a flowable hardenable material such as a cement mix, comprising:
 a. a cylindrical mould mounted for rotation on a horizontal axis and having a removable end plate, said mould and end plate being such that a cylindrical body formed within the mould can be extracted by sliding without dimensional change after removal of said end plate;
 b. means for feeding said material directly onto the inner surface of said mould or onto a liner therein,
 c. a mandrel movable axially into the mould through the end of the mould having the removable end plate, said mandrel having a cylindrical surface engageable with the inside surface of a cylinder of the material as formed within the mould by spinning,'
 d. mounting means for said mandrel allowing movement thereof axially into the mould and also allowing rotation thereof after removal from the mould,
 e. means for holding said cylinder on the mandrel during extraction thereof from the mould, said holding means including ports in the cylindrical surface of said mandrel and conduit means connecting said ports to a vacuum source,
 f. means for forming a longitudinal division in said cylinder of the material to allow the material to be laid out as a sheet, and
 g. a surface for receiving a soft sheet of the material released from the mandrel, means being provided to allow relative transverse movement between said mandrel and said surface with rotation of the mandrel to facilitate unrolling of the sheet from the mandrel.

18. Apparatus according to claim 17, wherein said ports are connected to said vacuum source via valve means which allow selected of said ports to be disconnected from the vacuum source during unrolling of the sheet.

19. Apparatus for forming into sheet form a flowable hardenable material such as a cement mix, comprising:
 a. a cylindrical mould mounted for rotation on a horizontal axis and having a removable end plate, said mould and end plate being such that a cylindrical body formed within the mould can be extracted by sliding without dimensional change after removal of said end plate,
 b. means for feeding said material directly onto the inner surface of said mould or onto a liner therein, said feeding means including conduit means having a plurality of outlets spaced along the mould,
 c. spreader means mounted for movement radially of the mould to contact the interior surface of material being spun in said mould to assist in evenly spreading said material,
 d. means for skimming water from within the cylinder of material being spun within the mould,
 e. a mandrel movable axially into the mould through the end of the mould having the removable end plate, said mandrel having a cylindrical surface engageable with the inside surface of a cylinder of the material as formed within the mould by spinning,
f. mounting means for said mandrel allowing movement thereof axially into the mould and also allowing rotation thereof after removal from the mould,
g. means for holding said cylinder on the mandrel during removal thereof from the mould,
h. means for forming a longitudinal division in said cylinder of material, whereby said cylinder can be removed from said mandrel and laid out as a flat or curved sheet.

20. Apparatus according to claim 19, wherein said spreader means is attached to a vibrator to cause vibration of said spreader means for compacting the material in the mould.

21. Apparatus according to claim 1, wherein said mandrel has a cylindrical surface formed by a curved metal plate, said metal plate being expandible to contact the inner surface of a cylinder of the material held within the mould and said metal plate having longitudinal edges which are spaced apart when the plate is expanded, whereby said slitting means may be positioned to pass between said longitudinal edges after slitting the said cylinder.

* * * * *